Oct. 30, 1923.
G. W. DOVER
1,472,356
AUXILIARY WINDSHIELD
Filed Aug. 2, 1921
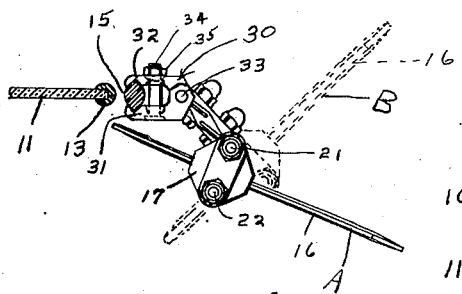
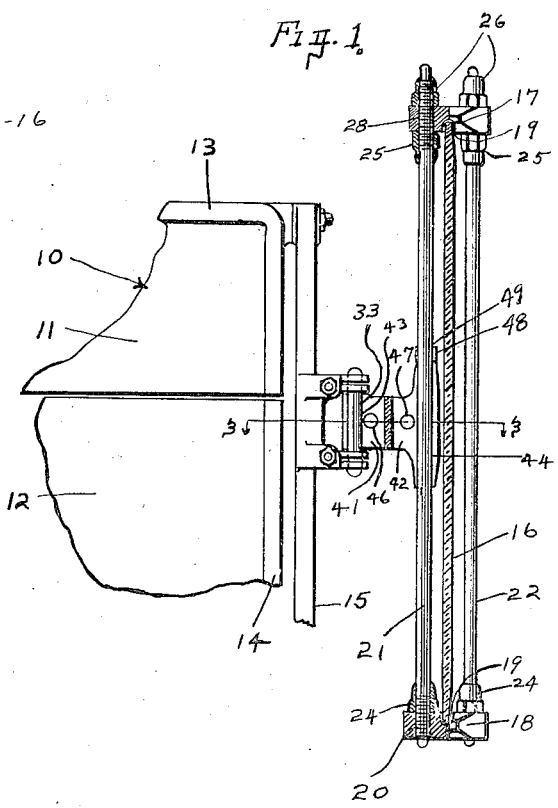
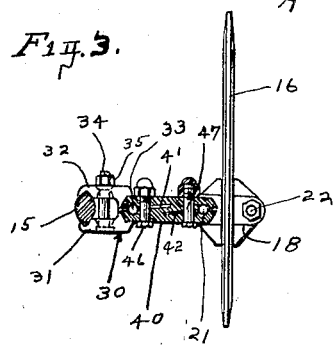
INVENTOR.
GEORGE W. DOVER
BY Perley H. Plant
ATTORNEY.

Patented Oct. 30, 1923.

1,472,356

UNITED STATES PATENT OFFICE.

GEORGE W. DOVER, OF CRANSTON, RHODE ISLAND.

AUXILIARY WINDSHIELD.

Application filed August 2, 1921. Serial No. 489,157.

*To all whom it may concern:*

Be it known that I, GEORGE W. DOVER, a citizen of the United States, residing at Cranston, in the county of Providence and State of Rhode Island, have invented certain new and useful Improvements in Auxiliary Windshields, of which the following is a specification.

This invention relates to an auxiliary windshield and more particularly to a windshield adapted for use upon automobiles.

One object of the invention is to provide transparent shield members adapted for use upon automobiles in connection with the main windshield now commonly used on vehicles of this character for preventing the wind from drawing in around the side edges of the main windshield and thus prevent the creation of a draft through the body of the vehicle, or for creating a draft within the body of the vehicle when driving as may be desired, the elimination of the draft through the body of the vehicle or the creation of the same being dependent upon the angular position of the auxiliary shield.

Another object of the invention is to provide an improved mounting for the transparent shield section whereby the same may be securely held without danger of being broken by the tension exerted upon the same by the holding means.

A further object of the invention is to provide an improved supporting means for the auxiliary shield whereby it may be readily moved to any desired position relative to the main windshield and at the same time be held in adjusted position against accidental movement.

Other objects and advantages of the invention relate to improved details of construction and methods of operation, as will be more fully set forth in the detailed description to follow.

Referring to the drawings:

Fig. 1 is an elevational view, certain of the parts being broken away to show the structure in detail.

Fig. 2 is a top plan view of the auxiliary shield structure, and,

Fig. 3 is a sectional view taken substantially along the line 3—3 of Fig. 1.

In the embodiment of the invention illustrated herewith, 10 designates the main windshield of an automobile formed of the usual sections 11 and 12 which are mounted in frames 13 and 14, respectively, the frames being carried by the usual upright supports 15.

The auxiliary shield section 16 of transparent material is held in position by upper and lower supporting elements 17 and 18, the said supporting elements being similar in construction and each provided with a slot 19 formed therein for the reception of one edge of the transparent shield section.

The supporting element 18 is provided with threaded openings 20 located upon opposite sides of the slot 19 within which are threaded the lower ends of parallel rods 21 and 22 located upon opposite sides of the transparent shield member 16.

Lock nuts 24 are also threaded upon the lower ends of the rods 21 and 22 above the supporting element 18 and are adapted to be turned down into engagement with the upper face of the element 18 to hold the rods against rotation in assembling the shield structure. Lock nuts 25 are threaded upon the upper ends of the rods 21 and 22 below the supporting element 17 and similar nuts 26 are threaded upon the rods above the supporting element 17 after the rods have been passed through openings 28 formed in the supporting element.

By means of the structure above described movement of the supporting elements towards and from each other is so controlled as to be directed along a path parallel to the plane of the shield section and thus cause the pressure exerted upon the shield section by the supporting elements to act in paths parallel to the surface of the shield section.

In this way any tendency to spring or break the shield section such as may be experienced when only one rod is employed is overcome and the shield section is firmly held in place without being subjected to undue strain.

One or more connecting members may be employed for connecting the shield section to the upright support, one only of such members being shown in the present instance although it is to be understood that two or more may be employed if desired.

The jointed connecting member shown herewith for connecting the rod 21 with the upright support 15 comprises a clamping hinge member 30 provided with a pair of hinge sections 31 and 32 rotatably mounted upon a pintle 33, and adapted to be held in clamping engagement with the upright support 15 by means of a bolt 34 and nut 35. When the nut 35 is threaded down so as to clamp the hinge sections 31 and 32 to the upright support the sections bind upon the pintle 33 and tend to hold the same against rotation relative to the hinge sections.

A block 40 provided with oppositely extending slots 41 and 42 has formed therein bearings 43 and 44 communicating with the slots 41 and 42, respectively, and adapted to receive the pintle 33 and the rod 21. Bolts 46 and 47 are passed through the block 40 transversely of the slots for drawing the end portions of the block into binding engagement with the pintle and rod whereby a frictional mounting is provided for both the pintle and rod, the frictional resistance of each bearing being capable of being varied as desired to increase or decrease the frictional resistance to the rotation of the rod and pintle in the bearings.

The provision of the slotted block 40 affords a two-point frictional mounting for the shield section, whereby the same can be readily swung into any desired position relative to the main windshield, while, by means of the bolts 46 and 47, the frictional resistance to the turning of the rod or pintle in their bearings may each be varied as desired so as to enable the apparatus to be so adjusted as to enable the shield member to be rotated either about the rod 21 or the pintle 33 or both and at the same time frictionally hold the shield member in its adjusted position and prevent its accidental movement therefrom.

It will be understood that when the bolt 46 is tightened to a greater degree than the bolt 47 there will be a tendency for the shield to rotate upon the rod 21 in preference to the pintle 33, while when the bolt 47 is tightened more than the bolt 46 the shield will tend to move about the pintle 33 when rotated. In this way, any desired angular position of the shield can be readily obtained and by properly adjusting the binding bolts the shield can be moved into or out of the desired operative position without any considerable exercise of care in turning the same.

A sleeve member 48 is preferably mounted upon the rod 21 and secured thereto by means of a pin 49 passed through the rod and a portion of the sleeve member whereby the sleeve member is held against movement longitudinally of the rod. The sleeve member 48 is located in such a position upon the rod 21 as to be engaged by the block 40 and thus serve as a stop to prevent the shield member from sliding downwardly as it rotates about the rod 21.

Thus the auxiliary shield member is always retained in proper position relative to the main windshield.

The auxiliary windshield may be placed in the position indicated by A in Fig. 2 thus deflecting the air and preventing a draft within the body of the vehicle, or it may be turned into the position indicated by B in Fig. 2 of the drawing thus causing air to be deflected into the body of the vehicle to cause circulation of air therein.

While I have shown and described in considerable detail the preferred embodiment of my invention in order to make the construction and operation of the same clear to those skilled in the art, I do not desire to be limited to the precise details of construction shown and described except as the same may be properly embraced in the terms of the following claims when broadly construed in the light of my invention.

Having described my invention, what I claim is:—

1. In an auxiliary windshield for vehicles, the combination of a shield member, supporting elements for the shield member, a pair of rods connecting the said elements upon opposite sides of the shield member, and means for supporting one of said rods from a portion of the vehicle.

2. In an auxiliary windshield, the combination of a transparent shield member, supporting elements engaging the said member at opposite edges thereof, and means located upon opposite sides of said shield member and connecting said elements whereby the pressure exerted upon the shield member by the supporting elements is directed parallel to the plane of said shield member.

3. In an auxiliary windshield for vehicles, a transparent shield member, supporting elements engaging opposite edges of said member, and parallel rods located upon opposite sides of said member and serving as guides for said elements to insure movement of the same towards and from each other along a path parallel to the plane of said shield member.

4. In an auxiliary windshield for vehicles, in combination, an upright supporting member, a transparent shield member, a support for said shield member extending throughout a portion of its length in substantial parallelism with said shield member, and frictional holding means including a block provided with oppositely directed slots formed therein for movably supporting said shield supporting member from said upright support.

5. In an auxiliary windshield, the combination of a transparent shield member, supporting means for said shield member comprising a rod adjacent to the face of said shield member and spaced therefrom, means on the rod engaging and supporting said shield member, an upright support, means connecting said rod and said upright support comprising a block provided with oppositely directed slots formed therein, and means cooperating with said block for causing the same to frictionally engage two separate members whereby the said shield member may move about either of two points as an axis.

6. In an auxiliary windshield, the combination of an upright support, a pivot shaft carried by said upright support and fixedly positioned relative thereto, a transparent shield member, a rod located adjacent to said shield member and provided with means for engaging and supporting said shield member, an integral member provided with oppositely directed slots and bearings communicating therewith for receiving and frictionally engaging said pivot shaft and said rod, and means for varying the degree of frictional engagement between said member and said rod and pivot shaft.

7. In an auxiliary windshield, the combination of a shield member, an adjustable two-point mounting for said member, including a block provided with bearings and oppositely directed slots communicating with said bearings, and means for varying the frictional resistance of said bearings.

8. In an auxiliary windshield, the combination of a shield member provided with a rod extending parallel thereto, an upright support, a hinged clamping member engaging said support, and a slotted block provided with bearings for adjustably engaging said rod and the pintle of said hinge clamp, and means for varying the frictional resistance between the bearings and said rod and pintle.

9. In an auxiliary windshield, the combination of a shield member, an adjustable two-point mounting for said member comprising spaced pivot rods and an integral block provided with separate bearings for said rods and oppositely directed slots communicating with said bearings whereby the frictional resistance of said rods in said bearings may be varied, and means for selectively varying the frictional resistance of said rods in the bearings.

In testimony whereof I have affixed my signature.

GEORGE W. DOVER.